United States Patent
Barret et al.

(10) Patent No.: US 10,391,979 B2
(45) Date of Patent: Aug. 27, 2019

(54) WIPER BLADE CLIP

(71) Applicant: Valeo Systèmes d'Essuyage, Le Mesnil Saint Denis (FR)

(72) Inventors: Guillaume Barret, Laps (FR); Giuseppe Grasso, Le Breuil sur Couze (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/422,538

(22) Filed: Feb. 2, 2017

(65) Prior Publication Data

US 2017/0225656 A1    Aug. 10, 2017

(30) Foreign Application Priority Data

Feb. 4, 2016 (FR) ...................................... 16 50885

(51) Int. Cl.
*B60S 1/38* (2006.01)

(52) U.S. Cl.
CPC ............ *B60S 1/381* (2013.01); *B60S 1/3891* (2013.01); *B60S 1/3894* (2013.01); *B60S 1/387* (2013.01); *B60S 2001/3898* (2013.01)

(58) Field of Classification Search
CPC .... B60S 1/3886; B60S 1/3887; B60S 1/3894; B60S 1/381
See application file for complete search history.

(56) References Cited

U.S. PATENT DOCUMENTS

| 9,751,499 | B2 * | 9/2017 | Fujiwara | B60S 1/3445 |
| 2007/0192983 | A1 * | 8/2007 | Chen | B60S 1/38 15/250.001 |
| 2008/0289134 | A1 * | 11/2008 | Boussicot | B60S 1/381 15/250.32 |
| 2015/0158463 | A1 * | 6/2015 | Yi | B60S 1/34 15/250.38 |
| 2015/0329086 | A1 * | 11/2015 | Depondt | B60S 1/3877 15/250.38 |
| 2015/0343997 | A1 * | 12/2015 | Foss | B60S 1/38 15/250.201 |
| 2016/0016550 | A1 * | 1/2016 | Depondt | B60S 1/3879 15/250.38 |
| 2016/0016551 | A1 * | 1/2016 | Gaucher | B60S 1/381 15/250.001 |

FOREIGN PATENT DOCUMENTS

| DE | 102014213976 A1 * | 1/2016 | B60S 1/381 |
| FR | 2975064 A1 * | 11/2012 | B60S 1/3894 |

* cited by examiner

*Primary Examiner* — Michael D Jennings
(74) *Attorney, Agent, or Firm* — Osha Liang LLP

(57) ABSTRACT

Clip (15) for a wiper blade (10), which clip is configured to be interposed between an end-piece (22) of the blade (10) and an aerodynamic spoiler (20) of a longitudinal cover member of the blade (10), characterized in that the said clip (15) comprises first means (25) able to collaborate by friction and/or anchorage with the end-piece (22) and second means (27) able to collaborate by friction and/or anchorage with the spoiler (20).

18 Claims, 5 Drawing Sheets

WIPER BLADE CLIP

TECHNICAL HELD

The present invention relates to a clip for a wiper blade, which clip is intended to secure an end-piece of the blade to an aerodynamic spoiler of the blade. Another subject of the invention is a wiper blade fitted with the said clip and a method for securing the end-piece to the spoiler using the said clip.

PRIOR ART

Typically, a wiper blade for a window such as the windscreen of a motor vehicle comprises a blade rubber, generally made of rubber, intended to wipe against the window of the vehicle in order to remove water by sweeping it out of the field of view of the driver. The blade further comprises a longitudinal spine which stiffens the blade rubber, so as to encourage this blade rubber to press against the windscreen, and a fixture that supports the spine and the blade rubber. The blade also comprises a longitudinal cover member comprising an upper aerodynamic spoiler intended to improve the pressing of the blade against the windscreen and therefore the aerodynamic performance of the system.

The blade is attached to a rotary wiper arm by an assembly made up of a mechanical connector and of an adapter. The connector is a component which is fixed directly to the structure of the blade, the adapter being an intermediate component that allows the connector to be fixed to the wiper arm. These two components are connected to one another by a transverse pin that allows the relative rotation thereof.

The stiffening spine, the blade rubber and the fixture supporting the blade are blade components of longitudinal main orientation. The spine and the blade rubber are introduced with longitudinal sliding into complementary longitudinal housings of the fixture.

The longitudinal immobilization of the cover member, and of the spine and of the blade rubber in the housings of the fixture is achieved by end-pieces mounted on each end of the blade.

Each end-piece is produced in such a way as to be locked onto the associated end of the spine and so as to form a longitudinal end-stop for the associated ends of the cover member, of the fixture and of the blade rubber.

The present invention proposes a clip that allows each end-piece of the blade to be secured to the aerodynamic spoiler of the cover member in such a way as to make the assembly more robust and make the blade easier to assemble. The clip notably avoids accidental disassembly of the end elements with respect to the cover member.

SUMMARY OF THE INVENTION

One subject of the invention is thus a clip for a wiper blade, which clip is configured to be interposed between an end-piece of the blade and an aerodynamic spoiler of a longitudinal cover member of the blade.

According to the invention, the clip comprises first means able to collaborate by friction and/or anchorage with the end-piece and second means able to collaborate by friction and/or anchorage with the spoiler.

Thus, advantageously, the presence of the first and of the second means allows the clip to be secured both to the end-piece of the blade and to the aerodynamic spoiler, this making it possible for the end-piece to be secured to the spoiler via the clip. The end-piece and the spoiler can therefore be likened to a single component that is then slid onto a longitudinal support member of the blade, rendering the blade more robust and simplifying the assembly thereof.

The securing of the clip to the end-piece and to the spoiler can thus be performed by friction of the first and/or of the second means, namely through a movement with pressure of the first and/or second means of the clip with respect to the component, and/or by anchorage of the first and/or second means, namely by fixing of the first and/or second means in a receiving or bearing zone of the component, such as a groove or a boss for example, or by crimping of the first and/or second means.

The first and/or the second means may be projecting.

The first and/or the second means advantageously comprise at least one pointed end.

The first means and the second means may comprise one or more tabs which are preferably elastically deformable.

The clip may be of elongate shape and may have a substantially U-shaped cross section, the clip comprising two substantially parallel flanges each forming one branch of the U.

The clip may comprise, on each flange, a first series of at least one tab, referred to as first tab, which is preferably elastically deformable, and able to collaborate by anchorage and/or friction with the end-piece, and a second series of at least one tab, referred to as second tab, which is preferably elastically deformable, and able to collaborate by anchorage and/or friction with the spoiler.

The first and/or the second tabs of the clip may be arranged symmetrically in pairs with respect to the longitudinal plane of symmetry of the cap.

Each first and/or second tab may be inclined with respect to the flange from which it is derived.

The angle of inclination of each first and/or second tab with respect to the flange from which it is derived may be comprised between 10 and 20°.

The clip is advantageously made of a metallic material.

Another subject of the invention is an end-piece for a wiper blade which is fitted with a clip described hereinabove.

The clip may be arranged in an upper part of the end-piece in which part the end-piece has a substantially U-shaped cross section.

The end-piece may comprise at least one boss and/or notch able to collaborate by anchorage with the first means of the clip.

The end-piece may comprise longitudinal end-stop and/or lateral end-stop means for positioning the clip.

Another subject of the invention is a longitudinal cover member for a wiper blade, fitted with an aerodynamic spoiler, and comprising a clip described hereinabove.

The longitudinal cover member may also comprise an end-piece.

Another subject of the invention is a wiper blade comprising at least one clip described hereinabove.

Each clip may be secured to an end-piece of the blade and to an aerodynamic spoiler of the blade.

A final subject of the invention is a method for assembling an end-piece of a wiper blade with an aerodynamic spoiler of the said blade. The method according to the invention implements a clip described hereinabove.

The method may comprise a step of securing the clip to the end-piece by friction and/or anchorage, using the first means, and a step of securing the clip to the spoiler with friction and/or anchorage, using the second means.

DESCRIPTION OF THE FIGURES

The invention will be better understood and further details, features and advantages of the invention will become apparent from reading the following description given by way of nonlimiting example and with reference to the attached drawings in which.

DETAILED DESCRIPTION

Figure 1:
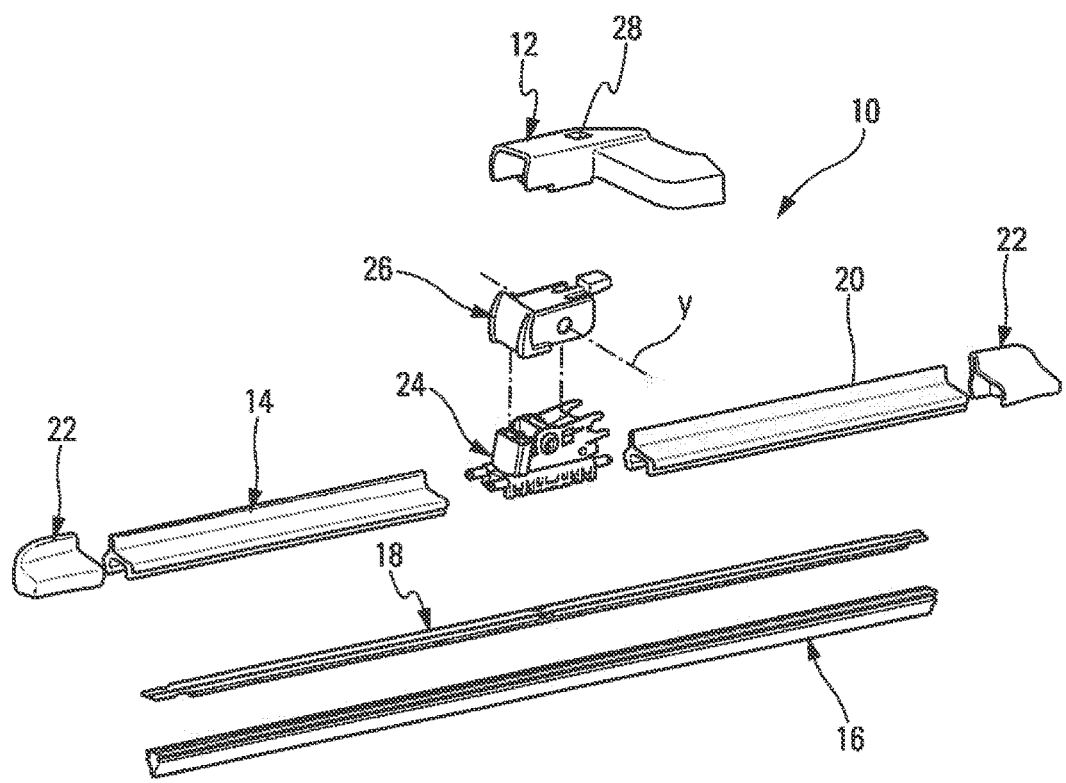
FIG. 1 is a perspective view of a wiper blade connected to a wiper-blade arm.

In the description which follows, the terminology longitudinal or lateral refers to the orientation of the wiper blade according to the invention. The longitudinal direction corresponds to the main axis of the blade along which it extends, whereas the lateral orientations correspond to straight lines that are concurrent, namely that intersect the longitudinal direction, notably being perpendicular to the longitudinal axis of the blade in its plane of rotation, in the case of the longitudinal directions, the terminology outer or inner is assessed in relation to the point of attachment of the blade to a wiper blade arm, the terminology inner corresponding to the part where the arm and a half-blade extend. Finally, directions referenced as upper or lower correspond to orientations perpendicular to the plane of rotation of the wiper blade, the terminology lower containing the plane of the windscreen.

With reference to FIGS. 1 to 8, elements that are identical or functionally equivalent are identified by identical reference numerals.

FIG. 1 illustrates a wiper, particularly a windscreen wiper of a motor vehicle, this wiper comprising a longitudinal wiper blade 10 and a wiper-blade arm 12 which is partially depicted and intended to be driven by a motor to follow a back and forth angular movement that allows water and possibly other undesirable elements with which the windscreen is covered to be cleared away.

The blade 10 here comprises a longitudinal cover member 14, a longitudinal wiping blade rubber 16, generally made of rubber, and at least one longitudinal spine 18 which provides the blade rubber 16 with stiffness to encourage this blade rubber 16 to press against the windscreen.

The cover member 14 of the blade 10 comprises an upper aerodynamic spoiler 20 intended to improve the operation of the wiper, the purpose of this spoiler 20 being to improve the pressing of the blade 10 against the windscreen and therefore the aerodynamic performance of the system.

The blade 10 further comprises attachment pieces or end-pieces 22 for attaching the blade rubber 16 and the spine 18 to the cover member 14, these end-pieces 22 being situated at each of the longitudinal ends of the cover member 14.

The cover member 14 of the blade is, in this instance, made in two independent parts which are arranged substantially end to end and separated from one another by an intermediate connector 24. This connector 24 is therefore interposed between the two parts of the cover member 14 and may comprise means of fluidic connection of means that supply washer fluid from the connector 24 to pipes of the member 14.

For mounting on the arm 12, the blade 10 comprises an adapter 26 mounted on the connector 24 and allowing the blade 10 to be articulated with respect to the arm 12. The articulation of the blade 10 with respect to the arm 12 is an articulation in a rotational movement about an axis of rotation V perpendicular to the longitudinal axis of the blade 10. The blade 10 in fact needs to have at least one degree of freedom in rotation with respect to the arm 12 and, more specifically, with respect to a terminal component 28 of the arm 12, so as to allow the blade 10 to follow the curvature of the windscreen.

Figure 2:
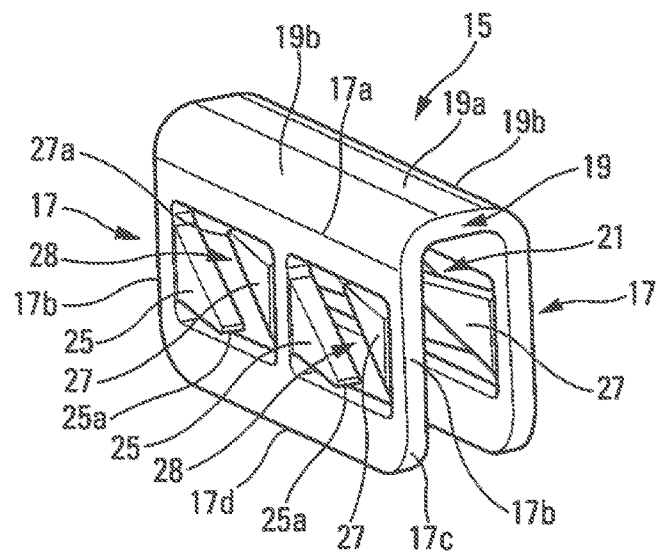
FIG. 2 is a perspective view of a clip according to the invention.

FIG. 2 illustrates a clip 15 according to the invention. The clip 15 is intended to secure an end-piece 22 of the blade 10 to an aerodynamic spoiler 20 of the longitudinal cover member 14 of the blade 10.

The clip 15 is of elongate shape and is substantially U-shaped in cross section. The clip 15 thus comprises two substantially parallel flanges 17 forming the branches of the U and a base 19 connecting the two flanges 17. The base 19 is substantially orthogonal to the flanges 17. The base 19 may comprise a flat central portion 19a connected to two curved end portions 19b each for example defining a quarter of a circle in cross section and which each connect the central portion 19a to a flange 17.

Each flange 17 may be delimited by an upper rectilinear border 17a contiguous with a curved end portion 19b of the base 19 via two rectilinear lateral borders 17b situated at each end of the upper rectilinear border 17a and substantially orthogonal thereto, by two curved lateral borders 17c, for example in the shape of a quarter-circle in longitudinal section, each connecting a rectilinear lateral border 17b to a lower rectilinear border 17d substantially parallel to the upper rectilinear border 17a.

The two flanges 17 of the clip 15 with the base 19 define a central housing 21 to accept the aerodynamic spoiler 20, particularly an upper end 23 of the spoiler 20 the perimeter of which closely matches the perimeter of the central housing 21. The outer surface of the clip 15 for its part is intended to be inserted into a housing in an end-piece 22, typically into a housing of substantially U-shaped cross section situated in the upper part of the end-piece 22.

According to the invention, the clip 15 is fitted with first means able to collaborate by friction and/or anchorage with the end-piece 22 and with second means able to collaborate by friction and/or anchorage with the spoiler 20.

The first means advantageously comprise one or more tabs (or teeth) 25, referred to as first tabs 25. Likewise, the second means advantageously comprise one or more tabs (or teeth) 27, referred to as second tabs 27. The first tabs 25 and the second tabs 27 are advantageously elastically deformable.

As illustrated in FIG. 2, each flange 17 comprises two first tabs 25 and two second tabs 27. However, it is possible to envisage a different number and layout for the tabs 25,27, particularly any number and any layout of tabs that allow the clip 15 to be secured to the end-piece 22 and to the spoiler 20.

The tabs 25,27 may be arranged symmetrically in pairs with respect to the longitudinal plane of symmetry of the clip 15. Thus, each first tab 25 of one flange 17 faces another first tab 25 of the other flange 17 and each second tab 27 of one flange 17 faces another second tab 27 of the other flange 17, allowing better cooperation between the clip 15 and the components that are to be secured.

The first tabs 25 and the second tabs 27 may be of triangular cross section. In particular, each flange 17 may comprise two sets 28 each made up of a first tab 25 and of a second tab 27. In the example depicted, each set 28 is of rectangular shape overall, each first tab 25 and each second tab 27 has the overall shape of a right-angled triangle. Each triangle is connected to the flange 17 which supports it by its base, the contours of each triangle being delimited by removal of material.

Each first tab 25 and each second tab 27 is thus fitted with a pointed end 25a,27a respectively. The presence of a pointed end 25a,27a allows better attachment of the clip 15, the catching being stronger and firmer. It is also possible to envisage other shapes for the tabs 25,27, particularly any shape comprising at least one pointed end.

The first and second tabs 25,27 are advantageously inclined (i.e. protruding) with respect to the flange 17 from which they are derived. The first tabs 25 are thus advantageously inclined towards the outside of the clip 15, in the direction of the end-piece 22, while the second tabs 27 are advantageously inclined towards the inside of the clip 15, in the direction of the spoiler 20. The inclination of the first and second tabs 25,27 allows better attachment of the clip 15, notably through friction. The inclination of the tabs 25,27 is preferably chosen in order to maintain sufficient space between the tabs 25,27 and the component that is to be secured (the end-piece 22 or the spoiler 20) while providing sufficient pressure against the component that is to be secured. The angle of inclination of each tab 25,27 with respect to the flange 17 from which it is derived is thus advantageously comprised between 10 and 20°.

It is, however, possible also to envisage the first and second tabs 25,27 not being inclined with respect to the flanges 17 to which they belong, namely for the first and second tabs 25,27 to be aligned with the flanges 17 to which they belong. In that case, the securing of the clip 15 to the component may be performed by crimping the first and second tabs 25,27 to the component, namely by deforming (folding over) each tab 25,27 from a position in which it is aligned with its flange 17 into an inclined position of the tab 25,27 in which position the tab 25,27 is in contact with the component that is to be secured and applies pressure thereto.

Figure 3:
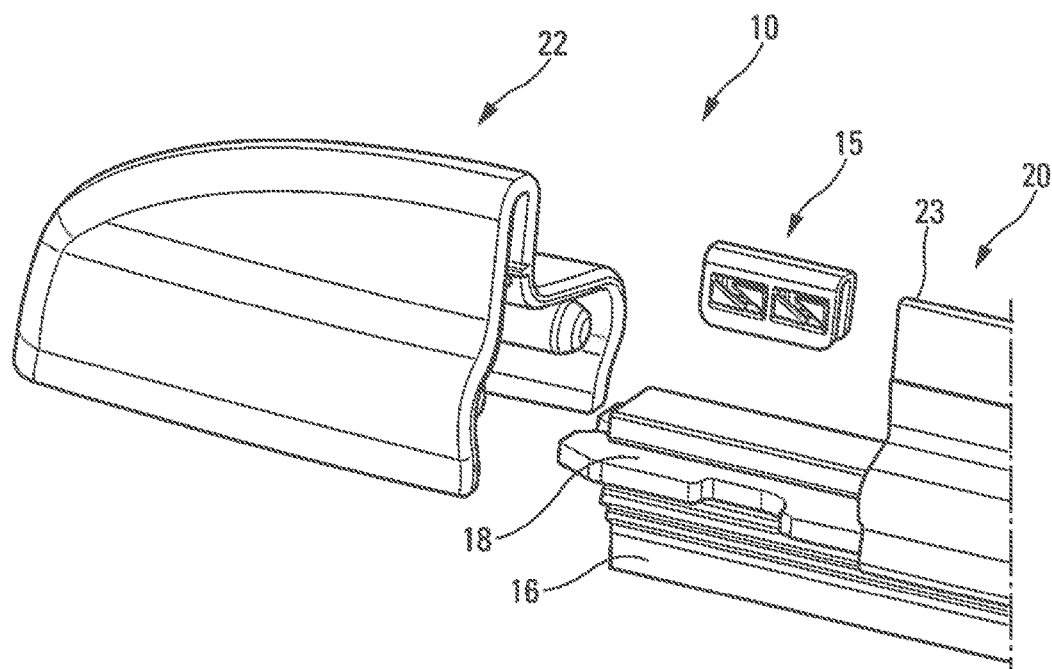
FIG. 3 is a partial exploded perspective view of a blade fitted with a clip according to the invention.
Figure 4:
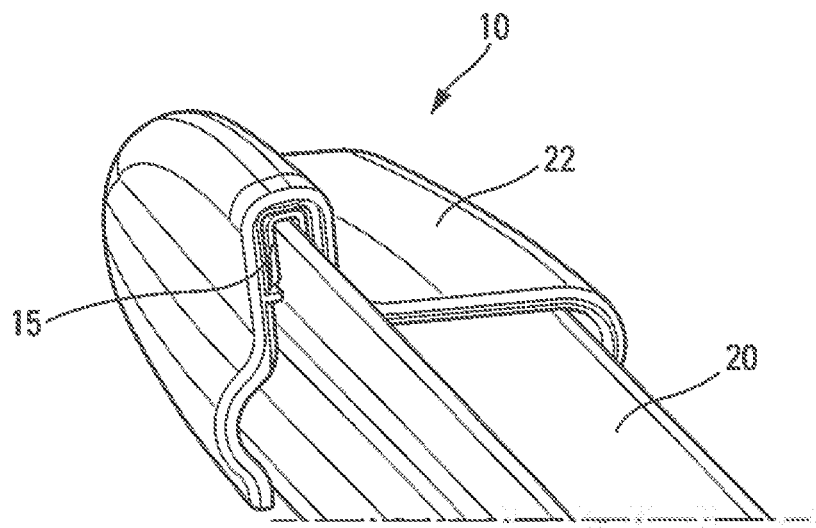
FIG. 4 is a partial perspective view of a blade fitted with a clip according to the invention.

FIG. 3 depicts, in exploded perspective, the positioning of the clip 15 inside the blade 10. The clip 15, of substantially U-shaped cross section, is intended to be placed between the upper end 23 of the spoiler 20 and the upper end of the end-piece 22, both of these likewise having a substantially U-shaped cross section.

It is also possible to envisage positioning the clip 15 between another part of the spoiler 20 and of the end-piece 22, the clip 15 then having a shape that matches the contour of the said parts.

Figure 5:
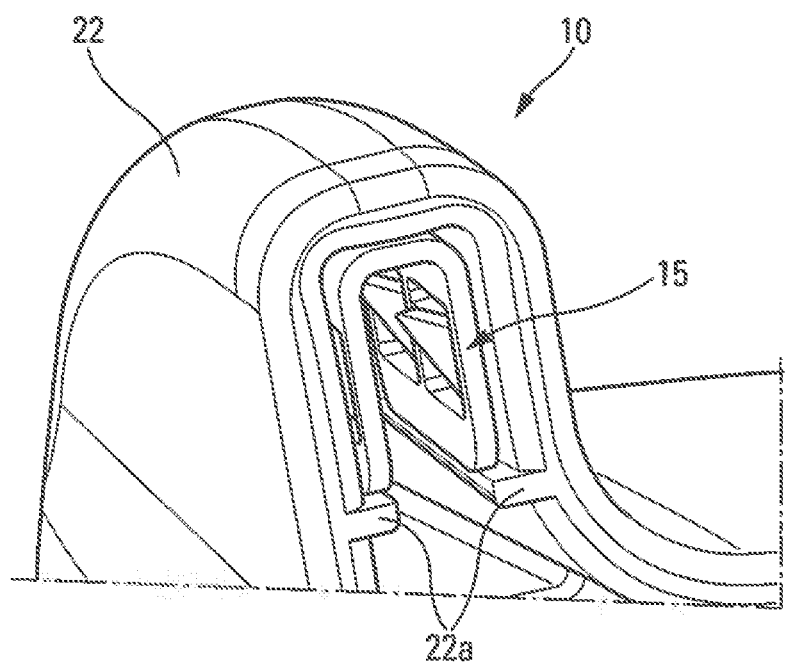
FIG. 5 is a detailed view of the blade of FIG. 4.
Figure 6:
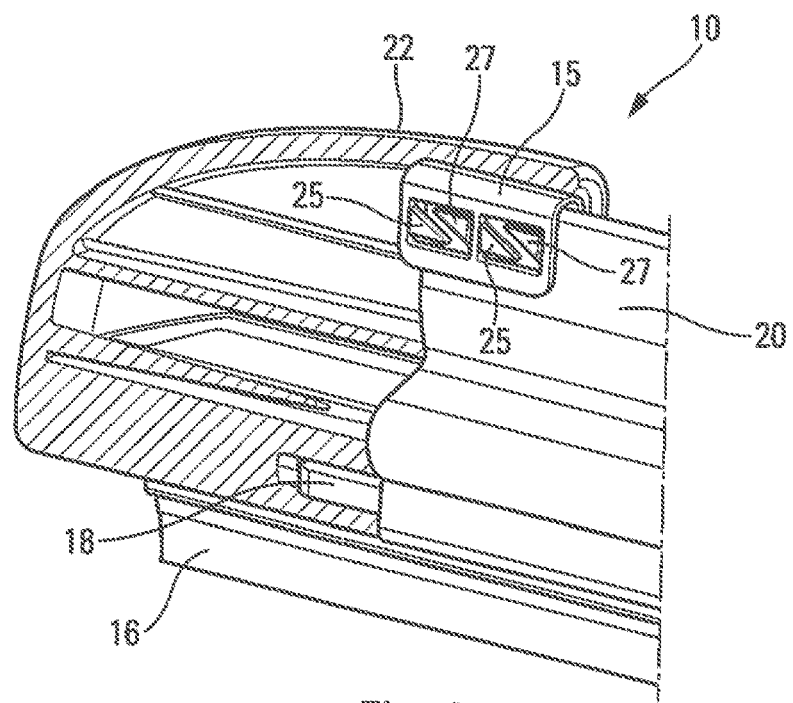
FIG. 6 is a detailed view in cross section of the blade of FIG. 4.

FIGS. 4 to 8 illustrate the clip 15 in the operational configuration. The end-piece 22 is advantageously fitted with two lower lateral end-stops 22a against which the flanges 17 of the clip 15, and notably the lower rectilinear borders 17d of the flanges bear (FIGS. 2 and 5). FIG. 6 illustrates the collaboration of the second tabs 27 with the spoiler 20.

Figure 7:
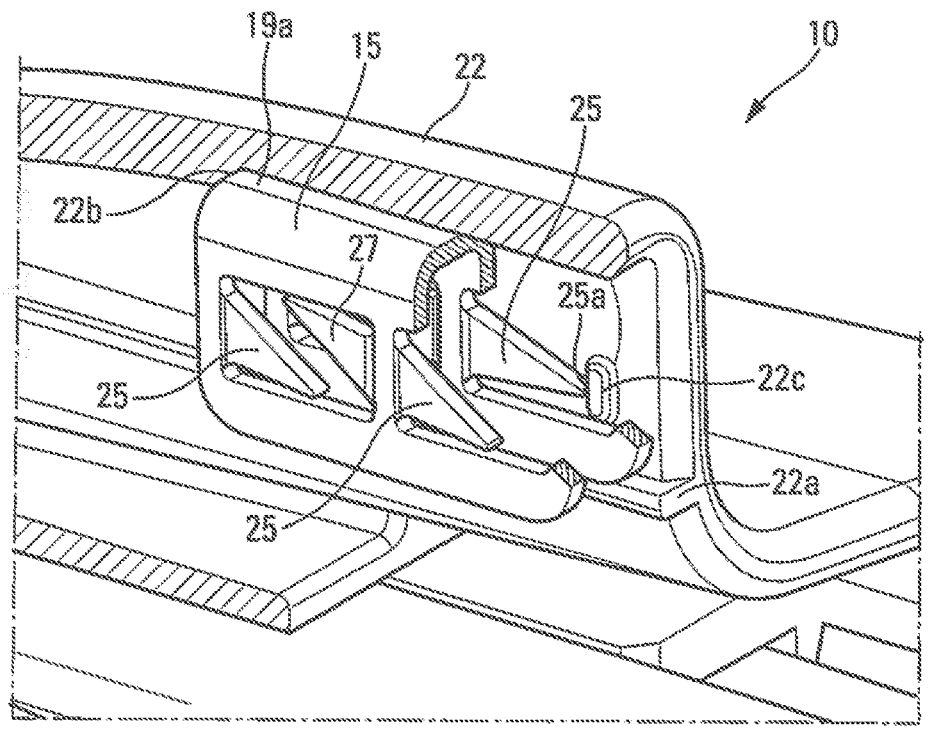
FIG. 7 is a partial perspective view of the blade of FIG. 4 according to a first alternative form of embodiment of the blade end-piece.

In an alternative form of embodiment, the end-piece 22 may comprise, in addition to the lower lateral end-stops 22a, additional means 22b,22c for anchoring the clip 15 inside the end-piece 22. The additional means may be longitudinal end-stop means of the clip 15, including en end-stop 22b formed by a shoulder in the internal upper surface of the end-piece 22 and intended to receive a longitudinal end of the central portion 19a of the base 19 of the clip 15, and at least one boss 22c protruding from the internal surface of the end-piece 22 and against which one end 25a of a first tab 25 of the clip 15 comes to bear (FIG. 7).

Figure 8:
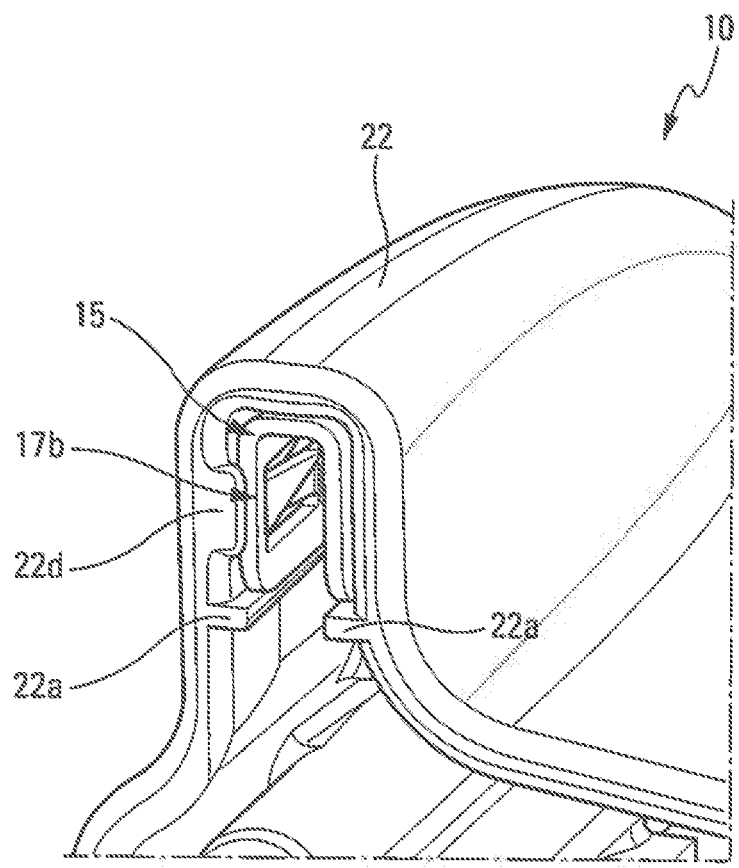
FIG. 8 is a partial perspective view of the blade of FIG. 4 according to a second alternative form of embodiment of the blade end-piece.

In another alternative form of embodiment, illustrated in FIG. 8, the end-piece 22 may be fitted, instead of the boss 22c or in addition thereto, with longitudinal end-stop means in the form of a flange 22d protruding from the internal surface of the end-piece 22 and arranged at the level of the entry of the end-piece 22. The flange 22d thus allows the rectilinear lateral border 17b of one of the flanges 17 of the clip 15 to be kept in abutment.

A method for assembling an end-piece 22 of the wiper blade 10 with an aerodynamic spoiler 20 of the blade 10 may comprise the following steps:

a step of securing the clip 15 to the end-piece 22 by friction and/or anchorage, using the first tabs 25, and a step of securing the clip 15 to the spoiler 20 with friction and/or anchorage, using the second tabs 27.

The order in which the two steps are performed is immaterial, it being possible also for the two steps to be performed simultaneously.

Once the end-piece 22 has been secured to the spoiler 20, assembly of the blade 10 may continue with the sliding of the assembly made up of end-piece 22 and spoiler 20 onto a longitudinal support member of the blade 10, for example onto the assembly formed by the spine 18 and the blade rubber 16 which have been inserted into the support fixture of the blade 10.

The invention claimed is:

1. A wiper blade comprising:
a clip configured to be interposed between an end-piece of the blade and an aerodynamic spoiler of a longitudinal cover member of the blade;
the end-piece; and
the aerodynamic spoiler, wherein the clip comprises:
a base connected to two flanges in a U-shaped manner;
first means for securing the end-piece, wherein the first means collaborates by at least one selected from a group consisting of friction and anchorage with the end-piece; and
second means for securing the aerodynamic spoiler, wherein the second means collaborates by at least one selected from a group consisting of friction and anchorage with the aerodynamic spoiler,
wherein the two flanges and the base define a central housing configured to accept the aerodynamic spoiler, and
wherein each of the two flanges comprises both the first means and the second means.

2. The wiper blade according to claim 1, wherein at least one selected from a group consisting of the first and the second means are projecting.

3. The wiper blade according to claim 1, wherein at least one selected from a group consisting of the first and the second means comprise at least one pointed end.

4. The wiper blade according to claim 1, wherein the first means and the second means comprise one or more tabs which are elastically deformable.

5. The wiper blade according to claim 1, wherein the clip further comprises an elongate shape and has a substantially U-shaped cross section, the two flanges substantially parallel to each other and each forming one branch of the U-shaped cross section.

6. The wiper blade according to claim 5, further comprising, on each flange, a first series of at least one first tab, which is elastically deformable and able to collaborate by anchorage and friction with the end-piece, and a second series of at least one second tab, which is elastically deformable and able to collaborate by at least one selected from a group consisting of anchorage and friction with the spoiler.

7. The wiper blade according to claim 6, wherein the first and the second tabs are arranged symmetrically in pairs with respect to the longitudinal plane of symmetry of the clip.

8. The wiper blade according to claim 6, wherein each first and second tab is inclined with respect to the flange from which the corresponding tab is derived.

9. The wiper blade according to claim 8, wherein the angle of inclination of each first and second tab with respect to the flange from which the corresponding tab is derived is comprised between 10 and 20°.

10. The wiper blade according to claim 1, wherein the clip made of a metallic material.

11. The wiper blade according to claim 1, wherein the clip is arranged in an upper part of the end-piece in which part the end-piece has a substantially U-shaped cross section.

12. The wiper blade according to claim 1, further comprising at least one boss configured to collaborate by anchorage with the first means of the clip.

13. The wiper blade according to claim 1, further comprising lateral end-stop means for positioning the clip.

14. The wiper blade according to claim 1, wherein the clip is arranged in an upper part of the end-piece in which part the end-piece has a substantially U-shaped cross section.

15. The wiper blade according to claim 1, wherein the end-piece comprises at least one boss configured to collaborate by anchorage with the first means of the clip.

16. The wiper blade according to claim 1, wherein the end-piece comprises lateral end-stop means for positioning the clip.

17. A method for assembling an end-piece of a wiper blade with an aerodynamic spoiler of the wiper blade, the method comprising:
  connecting a base of a clip to two flanges of the clip in a U-shaped manner to form a central housing; and
  using the central housing to accept the aerodynamic spoiler,
  wherein the perimeter of the aerodynamic spoiler substantially matches the perimeter of the central housing, and
  wherein each of the two flanges comprises first means for securing the end-piece and second means for securing the aerodynamic spoiler.

18. The method according to claim 17, further comprising securing the clip to the end-piece by friction and/or anchorage, using first means, and securing the clip to the aerodynamic spoiler with friction and/or anchorage, using second means.

* * * * *